United States Patent
Kazmi (10) Patent No.: US 8,874,116 B2
(45) Date of Patent: Oct. 28, 2014

(54) METHOD AND ARRANGEMENTS FOR AN EVENT TRIGGERED DRX CYCLE ADJUSTMENT

(75) Inventor: Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/487,631

(22) Filed: Jun. 4, 2012

(65) Prior Publication Data

US 2012/0300651 A1    Nov. 29, 2012

Related U.S. Application Data (63) Continuation of application No. 12/517,609, filed as application No. PCT/SE2007/050966 on Dec. 10, 2007, now Pat. No. 8,195,164.

(30) Foreign Application Priority Data

Dec. 20, 2006   (SE) ...................................... 0602775

(51) Int. Cl.
 | | |
 |---|---|
 | H04W 36/00 | (2009.01) |
 | H04W 52/02 | (2009.01) |
 | H04W 52/40 | (2009.01) |
 | H04W 76/04 | (2009.01) |

(52) U.S. Cl.
   CPC .............. *H04W 52/40* (2013.01); *H04W 76/04* (2013.01); *H04W 52/0216* (2013.01); *H04W 76/048* (2013.01); *H04W 36/0088* (2013.01)
   USPC ........... 455/437; 455/436; 455/442; 455/522; 455/441

(58) Field of Classification Search
   USPC ........................ 455/436, 437, 442, 522, 441
   See application file for complete search history.

(56) References Cited

U.S. PATENT DOCUMENTS

| | | | |
|---|---|---|---|
| 6,445,917 B1 * | 9/2002 | Bark et al. ..................... | 455/423 |
| 2002/0068566 A1 | 6/2002 | Ohlsson et al. | |

(Continued)

FOREIGN PATENT DOCUMENTS

| | | |
|---|---|---|
| EP | 1915010 A2 | 4/2008 |
| JP | 2000-358268 A | 12/2000 |

(Continued)

OTHER PUBLICATIONS

3rd Generation Partnership Project (3GPP); "3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 8)"; 3 GPP TS 36.300 V0.3.1; Nov. 2006; pp. 1-64; Valbonne, France.

(Continued)

*Primary Examiner* — Manpreet Matharu
(74) *Attorney, Agent, or Firm* — Patent Portfolio Builders PLLC (57) ABSTRACT

The invention relates to methods and arrangements for an event triggered DRX cycle adjustment. A user equipment located in a serving cell of a mobile communications network monitors downlink communication at predetermined time intervals when operating in discontinuous reception mode. The user equipment also performs communication parameter measurements regarding at least one of the serving cell and one or more neighbor cells. After the occurrence of a first event, the user equipment sends at least one of measurement data and a first event report to the network. The sending is triggered by the occurrence of the first event. The monitoring is caused to be performed at shortened time intervals after the occurrence of a second event, wherein the second event is defined to indicate a higher probability of receiving a handover command than the first event.

44 Claims, 6 Drawing Sheets

(56) References Cited

U.S. PATENT DOCUMENTS

| | | | |
|---|---|---|---|
| 2002/0068571 A1 | 6/2002 | Ohlsson et al. | |
| 2007/0291729 A1* | 12/2007 | Dalsgaard et al. | 370/347 |
| 2009/0186614 A1* | 7/2009 | Aoyama et al. | 455/436 |

FOREIGN PATENT DOCUMENTS

| | | | |
|---|---|---|---|
| JP | 2001-285911 A | 10/2001 | |
| JP | 2003-500909 A | 1/2003 | |
| JP | 2008-522568 A | 6/2008 | |
| WO | 2007052141 A1 | 5/2007 | |
| WO | 2007088381 A1 | 8/2007 | |
| WO | 2007127800 A2 | 11/2007 | |
| WO | 2007/148175 A1 | 12/2007 | |
| WO | WO2007148175 * | 12/2007 | H04Q 7/32 |
| WO | 2008/001726 A1 | 1/2008 | |
| WO | 2008043560 A1 | 4/2008 | |
| WO | 2008/072912 A1 | 6/2008 | |

OTHER PUBLICATIONS

International Search Report for corresponding International Application No. PCT/SE2007/050966 mailed May 21, 2008.

Written Opinion for corresponding International Application No. PCT/SE2007/050966 mailed May 21, 2008.

Partial English Translation of Japanese Office Action in corresponding Japanese Application No. JP2009-542719 dated Dec. 25, 2013.

Latvia Riga, Nokia, "Measurements in E-UTRAN", 3GPP TSG-RAN WG #56; R2-063068, Nov. 6-10 2006, XP050132580.

3GPP TR 25.813 vol. 7.1.0, Technical Report, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interference Protocol Aspects (Release 7); Sep. 2006, XP002470392.

Latvia Riga, NTT DoCoMo, Inc, "Views on DRX/DTX Control in LTE", 3GPP TSG-RAN WG2 #56; R2-063397, Nov. 6-10 2006, XP00790521.

Ericsson, "DRX and DTX in LTE_Active", 3GPP TSG-RAN WG2 Meeting #52; Tdoc R2-060967, Athens, Greece, Mar. 27-31, 2006, XP002463498, pp. 1-5.

Ericsson, "Handover Procedure for DRX Operation in LTE_ACTIVE", 3GPP TSG-RAN WG2 Meeting #56bis; R2-070043 Sorrento, Italy, Jan. 15-19, 2007, XP050133160.

Research in Motion Limited, "DRX operation During Handover", 3GPP TSG-RAN WG2 Meeting #58; R2-071956 Kobe, Japan, May 7-11, 2007, XP002455654.

European Extended Search Report issued in n a corresponding EP Application No. EP 07852238.0 and mailed on Aug. 19, 2013.

Office Action in corresponding U.S. Appl. No. 14/031,234 dated Apr. 24, 2014.

* cited by examiner

METHOD AND ARRANGEMENTS FOR AN EVENT TRIGGERED DRX CYCLE ADJUSTMENT

TECHNICAL FIELD

The present invention relates to methods and arrangements in a telecommunication system, in particular to methods and arrangements for an event triggered DRX cycle adjustment.

BACKGROUND

Among others the following definitions and abbreviations will be used in the description below.

ASIC Application Specific Integrated Circuit
CPICH Ec/No The received energy per chip divided by the power density in the band
CPICH RSCP Common Pilot Channel Received Signal Code
Power
DRX Discontinuous Reception
DTX Discontinuous Transmission
eNB E-UTRAN NodeB
E-UTRA Evolved UTRA
E-UTRAN Evolved UTRAN
FDD Frequency Division Duplex
LTE Long Term Evolution
MAC Medium Access Control
RRC Radio Resource Control
RRM Radio Resource Management
RSRP Reference Signal Received Power
RSRQ Reference Signal Received Quality
SINR Signal to Interference plus Noise Ratio
UE User Equipment
UTRA Universal Terrestrial Radio Access
UTRAN Universal Terrestrial Radio Access Network
TTI Transmission Time Interval
WCDMA Wide band Code Division Multiple Access Universal Terrestrial Radio Access Network (UTRAN) is a conceptual term that identifies that part of the network which consists of Radio Network Controllers (RNCs) and Node Bs. This Communications network is commonly referred to as 3G. Evolved UTRAN (E-UTRAN) is an evolution of the 3G radio access network towards a high-data rate, low-latency and packet-optimised radio access network.

The document 3GPP TS 36.300, V 0.3.1 (2006-11) provides an overview and overall description of the E-UTRAN radio interface protocol architecture.

The E-UTRAN is fundamentally a packet oriented system. This means that users transmit and receive data in non-continuous fashion. One important implication is that at a given time not all the users are active (i.e. not all the active users communicate simultaneously). This inherent characteristic of packet transmission is intended to be fully exploited in E-UTRAN system.

One important aspect of packet transmission is discontinuous transmission (DTX) and discontinuous reception (DRX). The E-UTRAN is primarily a packet-oriented system without any circuit switched transmission. This means that E-UTRAN can easily be optimized for packet transmission. One important feature introduced in E-UTRAN is the possibility of UE entering into DRX mode. In E-UTRAN there are three UE states with their context stored in the core network:

LTE__DETACHED
LTE_IDLE
LTE ACTIVE

However, only the last two states also have RRC context. Therefore, from radio resource allocation and usage perspective the last two states are the most interesting ones and are therefore further described below:

In the LTE_IDLE state the UE listens to the network (e.g. by means of paging information) only at DRX instant and performs downlink measurements according to the assigned DRX cycle length and autonomous cell reselection. In order to receive data the UE needs to enter into LTE_ACTIVE state, which is an essential feature in all cellular systems to allow UE battery saving.

In the LTE_ACTIVE state the UE is able to receive data and transmit data at any time. This implies that the network maintains the full RRC context on cell level in order to be able to schedule the user whenever required. (For this reason this state is also called RRC connected state on RRC level). The LTE_ACTIVE state has a sub-state called the DTX/DRX mode for the purpose of saving UE battery consumption in case of low activity. After a certain period of inactivity the UE enters into this sub-state and starts monitoring the downlink transmitted information only at a regular interval according to the network assigned DRX cycle. The DRX cycle in this case can vary typically between 5 ms up to 1-5 seconds. However, in case of much longer inactivity of packets the UE should preferably enter into idle mode.

The advantages of the type of DRX/DTX mode described above are that, on the one hand, it allows efficient UE battery savings while, on the other hand, the network can quickly schedule a UE without unnecessary delays caused by the formalities of the call setup procedure. The concept of the DRX/DTX sub-state in RRC connected state is also used in UTRA in continuous packet connectivity, which comprises purely packet oriented transmission.

Downlink scheduling information is used to inform the UE how to process the downlink data transmission. The scheduling information may include the UE identity, resource assignment, duration of assignment, modulation scheme, etc. and may be sent on a shared control channel, which comprises of mainly layer 1 (physical layer) and layer 2 (MAC layer) contents. Generally, this information is sent in every sub-frame (0.5 ms) or at least every TTI (e.g. 1 ms). Therefore, a UE in LTE_ACTIVE mode may have to monitor this information in every sub-frame or TTI depending upon the periodicity of the transmission of scheduling information.

The handover in LTE-ACTIVE state is network-controlled. This means that the UE reports measurements to the network in response to an event. An event occurs when one or more parameters take on a certain value or certain values. En event can for instance be configured to occur when one parameter reaches a certain value individually, or when one parameter reaches one value and another parameter reaches another value, i.e. as a combination of different parameter values. The event and/or measurement reporting either triggers idle gaps for more measurement (e.g. on other carrier frequency or other technologies) or leads to handover. During an idle gap the UE tunes its receiver to another E-UTRA carrier frequency or to a carrier frequency of another access technology (e.g. UTRA or GERAN) for performing the measurements. While performing such measurements the UE does not receive or transmit any data or signaling information on the serving E-UTRA carrier frequency. In the case of handover the UE receives a handover command from the network. In DRX mode in LTE-ACTIVE state the UE can receive any network information (e.g. scheduling of handover command) only at the DRX instant, i.e. when the UE becomes active. In case of long DRX cycle (e.g. 2 or 3 seconds) the handover command reception can be delayed. But to ensure good system performance (low handover latency) both the UE measurement reporting and handover command reception should not be delayed. At the same time the characteristics of DRX mode should be retained to ensure efficient UE battery consumption.

In E-UTRAN the UE reports in the LTE-ACTIVE state the configured events and the corresponding downlink measurements when the network configured event criteria or conditions are fulfilled. As indicated above, the UE can also, in an LTE_ACTIVE state, operate in DRX mode in which the UE monitors the downlink scheduling channel only at DRX instances. In order to prevent handover delay, it has been agreed that at the occurrence of an event the UE shall report both the measurement quantity and the event as quickly as possible without waiting for the next active period.

Another important aspect is the delivery of the handover command in response to the event triggered measurement reporting. Since the UE listens periodically only at DRX instances, this can unnecessarily delay the handover command reception especially in case of long DRX cycle. But in order to ensure low handover latency the handover command, whenever required, should be delivered to the UE as soon as possible. It has therefore also been agreed that the UE shall interrupt its DRX activity after each and every event triggered measurement report and start monitoring the scheduling control channel either continuously or according to a pre-configured shorter DRX cycle. This will allow the network to schedule the UE immediately for the purpose of sending a handover command. One major drawback with this approach is that in case the network does not send handover command the UE battery will be inefficiently utilized.

There are several reasons why the network may not send a handover command in response to an event-triggered measurement report: • The network may set lower threshold to get more frequent events for monitoring network performance (e.g. operational and maintenance issues).

Another reason is that event triggered report may not directly lead to a handover; rather this may trigger gap-assisted measurements {e.g. measurements on another frequency or on another access technology).

A particular UE measurement report may also be utilized for RRM functions other than handovers such as congestion control etc.

Depending upon the implementation not all measurements may trigger handover or at least some measurements may not directly trigger the handover. As an example in WCDMA the UE transmitted power reporting (and corresponding event) is used in the network to trigger the compressed mode. UTRAN can command that the UE enters into compressed mode depending on UE capabilities, which define whether the UE requires compressed mode in order to monitor cells on other FDD frequencies and on other modes and radio access technologies.

Depending upon a particular implementation the network may perform handover according to combination of measurements, e.g. based on UE transmitted power and downlink received SINR.

Thus, there are a number of cases in which the network does not send a handover command in response to an event triggered measurement report, whereby the following control channel monitoring leads to excess battery consumption in the prior art solution.

SUMMARY

It is an object of the present invention to overcome or at least alleviate some or all of the above-mentioned drawbacks of the prior art. Specifically, it is an object of the present invention to achieve a technique that alleviates the conflict between low power consumption and fast handover command reception in a user equipment that operates to monitor downlink communication at predetermined time intervals, e.g. given by a DRX cycle.

These and other objects, which will be apparent from the following description, are achieved completely or partially by means of a method in a user equipment, a method in a base station, a user equipment, and a base station according to the appended independent claims. Preferred embodiments are defined in the dependent claims.

The invention overcomes the problem of excess battery consumption in the UE due to unnecessary control channel monitoring by seeking to distinguish the case of handover command reception from the other cases.

This is achieved by the definition of new, additional event that specifically relates to this case.

From the UE battery consumption perspective it is beneficial to have this specific event that indicates a high probability of handover. Only at the setting of this particular event the UE should perform monitoring at shortened time intervals, by e.g. disregarding the DRX operation and entering into non DRX mode where it starts continuous monitoring of the downlink scheduling control channel.

The UE monitors the scheduling control channel at shortened time intervals, e.g. either continuously or according to a pre-configured shorter DRX cycle (i.e. non DRX mode), only when there is more certainty of receiving the handover command. This means the UE shall not monitor downlink communication at shortened time intervals, e.g. by entering into non DRX mode, in response to normal measurement reporting. Thus, the occurrence of the original first event, which has been described in the background section, does not cause monitoring to be performed at shortened time intervals. Instead the UE shall perform scheduling control channel monitoring at shortened time intervals, e.g. by entering non DRX mode, only in response to an event specifically meant for this purpose.

Hence the present invention defines a separate event that triggers monitoring of downlink communication at shortened time intervals, e.g. by triggering the non DRX mode at the UE for the reception of handover commands. In other words the normal measurement reporting is not directly linked to shortened time intervals, or e.g. the non DRX operation. This is because all measurement reports may not directly lead to handover. This will allow better UE power saving.

The invention relates in one aspect to a method in a user equipment that is located in a serving cell of a mobile communications network. According to the method downlink communication is monitored at predetermined time intervals when the user equipment is operating in discontinuous reception mode. Also, communication parameter measurements regarding at least one of the serving cell and one or more neighbour cells are performed. After the occurrence of a first event, at least one of measurement data and a first event report is sent from the user equipment to the network. The sending is triggered by the occurrence of the first event. Furthermore, the monitoring is caused to be performed at shortened time intervals after the occurrence of a second event. The second event is defined to indicate a higher probability of receiving a handover command than the first event.

In a second aspect, the invention relates to a method in a base station in a cell of a mobile communications network. A user equipment in the cell monitors downlink communication at predetermined time intervals when operating in discontinuous reception mode, and performs communication parameter measurements regarding at least one of the serving cell and one or more neighbour cells. According to the method, a first event is configured in the user equipment. The occurrence of the first event triggers sending of at least one of measurement data and a first event report from the user equipment to the base station. Also, the method comprises configuring a second event in the user equipment. The occurrence of the second event causes the monitoring to be performed at shortened time intervals. The second event is defined to indicate a higher probability of sending a handover command to the user equipment than the first event.

According to a third aspect of the invention, a user equipment located in a serving cell of a mobile communications network is provided. The user equipment comprises means for monitoring downlink communication at predetermined time intervals when operating in discontinuous reception mode. Also, means for performing communication parameter measurements regarding at least one of the serving cell and one or more neighbour cells are comprised.

Furthermore, it comprises means for sending at least one of measurement data and a first event report from the user equipment to the network after the occurrence of a first event. The sending is triggered by the occurrence of the first event. The user equipment also comprises means for causing the monitoring to be performed at shortened time intervals after the occurrence of a second event. The second event is defined to indicate a higher probability of receiving a handover command than the first event. The means utilised according to this third aspect, such as necessary antenna and radio equipment, are all standard user equipment components well known to a person skilled in the art. Also, the means for triggering monitoring to be performed at shortened time intervals could be implemented as for instance software that is run on one or more processors in the user equipment. Alternatively it could possibly be implemented by hardware, such as one or more ASICs.

In a fourth aspect, the invention relates to a base station in a cell of a mobile communications network. A user equipment in the cell monitors downlink communication at predetermined time intervals when operating in discontinuous reception mode, and performs communication parameter measurements regarding at least one of the serving cell and one or more neighbour cells. The base station comprises means for configuring a first event in the user equipment, whereby the occurrence of the first event triggers sending of at least one of measurement data and a first event report from the user equipment to the base station. It also comprises means for configuring a second event in the user equipment, whereby the occurrence of the second event causes the monitoring to be performed at shortened time intervals. The second event is defined to indicate a higher probability of sending a handover command to the user equipment than the first event. The means utilised according to this fourth aspect, such as antenna and radio equipment, are all standard base station components well known to a person skilled in the art. Software run on e.g. a processor in the radio base station could be used for logical operations, such as how to configure the first and the second events, respectively.

The present invention offers the advantage to allow a more efficient use of UE battery saving, by defining a new, second event that occurs when the probability of receiving a handover command in a user equipment is high.

It is another advantage of the present invention to provide more flexibility to the network in terms of threshold setting, since a number of different parameters and corresponding parameter values can be used to trigger downlink communication monitoring at shortened time intervals.

It is yet another advantage of the present invention to provide more flexibility to the network in terms of using a particular UE measurement for a purpose other than handover (e.g. O&M, triggering gap-assisted measurement, congestion control etc) but can still ensure good UE power saving.

Another advantage of the invention is that it can be used for other telecommunication network standards than E-UTRAN, such as WCDMA or GSM networks, in cases where those standards utilizes corresponding measurements and handover command schemes.

Further objectives, features, aspects and advantages of the present invention will appear from the following detailed disclosure, from the attached dependent claims as well as from the drawings.

BRIEF DESCRIPTION OF THE DRAWINGS

Exemplifying embodiments of the invention will now be described in more detail with reference to the accompanying schematic drawings.

DETAILED DESCRIPTION

Figure 1:
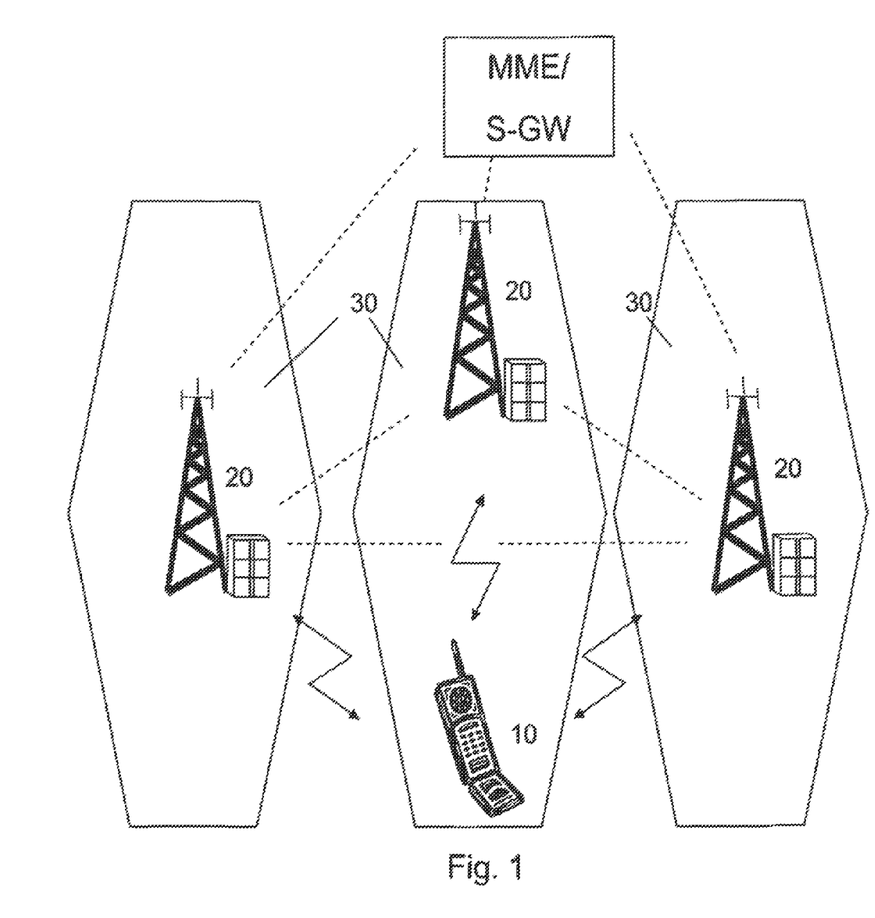
FIG. 1 schematically illustrates the general architecture in which embodiments of the invention can be used.
Figure 2:
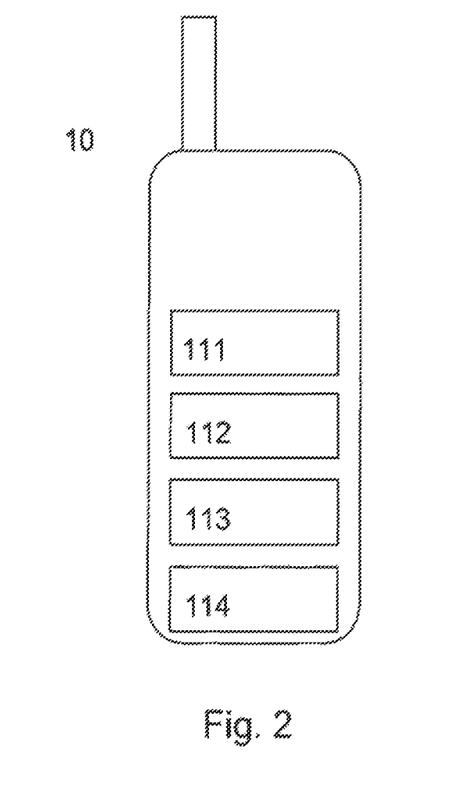
FIG. 2 schematically illustrates a user equipment for which embodiments of the invention can be used.

FIG. 1 shows the general architecture in which embodiments of the invention may be used. A mobile station 10, or user equipment (UE), is located within the coverage of a mobile communications network. The UE communicates with base stations 20, or E-UTRAN NodeB:s (eNB:s) in the case of LTE, which provides wireless network coverage for a particular coverage area commonly referred to as a cell 30. The cell 30 in which the UE 10 resides at a given moment is referred to as the serving cell. Neighbour cells are located adjacent to the serving cell. The eNBs are interconnected, and are also connected to the EPC (Evolved Packet Core), and more specifically to the MME (Mobility Management Entity) and to the Serving Gateway (S-GW). Radio Resource Control (RRC) terminates in eNB, and measurement configuration is done via RRC, which resides in eNB. FIG. 2 schematically shows a UE 10 that comprises standard wireless device components, such as an antenna arrangement, radio equipment, a logic unit that can be implemented for instance as a microprocessor, a CPU, or similar processing or computer means, as well as some kind of data storage unit or memory unit. The skilled person will realize that a user equipment comprises these and other components, and they will therefore not be described further in this application. The UE 10 in FIG. 2 comprises means 111 for monitoring downlink communication at predetermined time intervals, means 112 for performing communication parameter measurements, and means 113 for sending measurement data from the UE 10 to the network, whereby the sending is triggered by the occurrence of a first event. The UE 10 also comprises means 114 for causing the monitoring to be performed at shortened time intervals after the occurrence of a second event, which is defined to indicate a higher probability of receiving a handover command than the first event.

Figure 3:
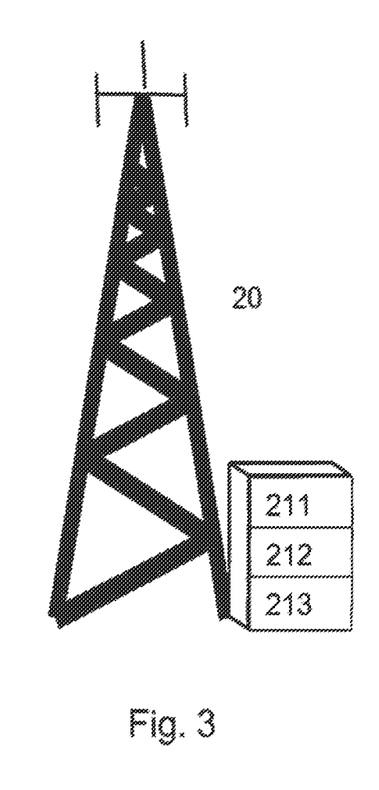
FIG. 3 schematically illustrates a radio base station for which embodiments of the invention can be used.

FIG. 3 schematically shows a network radio base station 20 that may be used in connection with the present invention. It comprises standard radio base station components, such as network interfaces, an antenna arrangement, radio equipment, a logic unit that can be implemented for instance as a microprocessor, a CPU, or similar processing or computer means, as well as some kind of data storage unit or memory unit. The radio base station 20 in FIG. 3 comprises means 211 for configuring a first event in a UE 10, whereby the occurrence of the first event triggers sending of measurement data from the UE to the base station. It also comprises means 212 for configuring a second event in a UE 10, whereby the occurrence of the second event causes monitoring to be performed at shortened time intervals. The second event is defined to indicate a higher probability of sending a handover command to the UE 10 than the first event. Furthermore, the radio base station 20 comprises means 213 for defining the first event and the second event in relation to parameter measurements. For instance, the means 213 may according to embodiments of the invention be used to configure that the second event shall occur when e.g. measured downlink quality and/or user equipment transmitted power reaches certain levels. The configuration of an event may imply that the radio base station signals the user equipment a set of specific parameters, such as threshold levels, time to trigger, etc, corresponding to that event.

Figure 4:
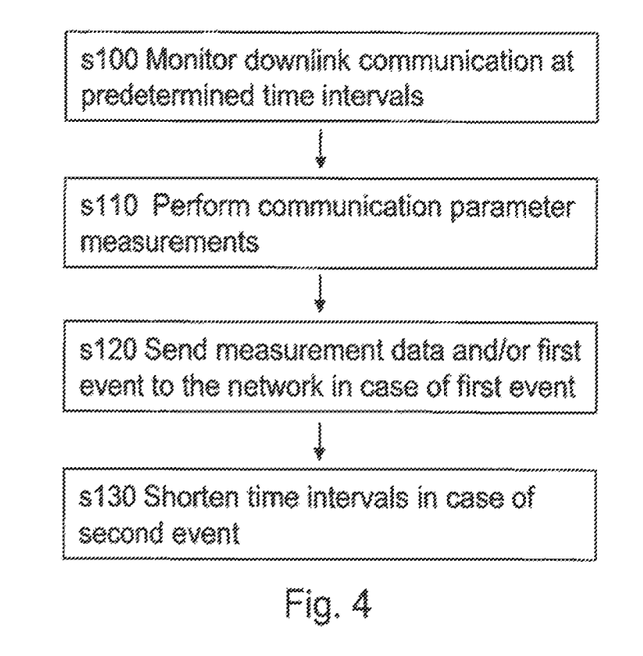
FIG. 4 illustrates a block diagram of the general flow of a method in a user equipment according to an embodiment of the invention.

FIG. 4 shows steps of a method in a UE 10 that are carried out according to embodiments of the invention. First, in sIOO the UE 10 monitors downlink communication at predetermined time intervals. In sII0 the UE 10 performs communication parameter measurements. Then, in sI20, the UE 10 sends measurement data and/or a first event report to the network. The sending is triggered by the occurrence of a first event. In sI30 the time intervals for performing monitoring are shortened as an effect of the occurrence of a second event. The second event is defined to indicate a higher probability of receiving a handover command than the first event.

Figure 5:
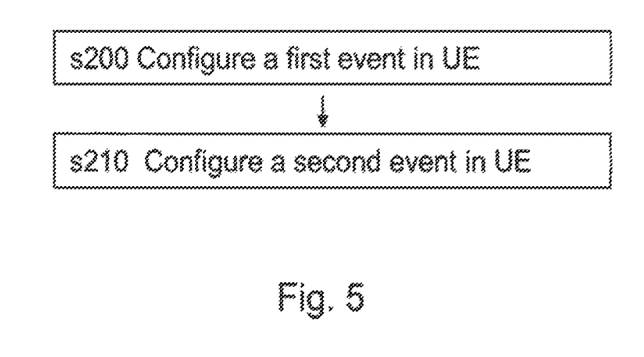
FIG. 5 illustrates a block diagram of the general flow of a method in a base station according to an embodiment of the invention.

According to embodiments of the invention, a method in a base station 20 is illustrated in FIG. 5. The base station 20 is located in a serving cell of a mobile communications network, wherein a UE 10 in the cell monitors downlink communication at predetermined intervals and performs parameter measurements. First, the base station 20 in s200 configures a first event in the UE 10, whereby the occurrence of the first event triggers sending of measurement data and/or a report, or message, that indicates the occurrence of the first event from the UE 10 to the base station 20. In s210 the base station 20 configures a second event in the UE 10. The occurrence of the second event causes the monitoring to be performed at shortened time intervals. Furthermore, the second event is defined to indicate a higher probability of sending a handover command to the UE 10 than the first event.

Figure 6:
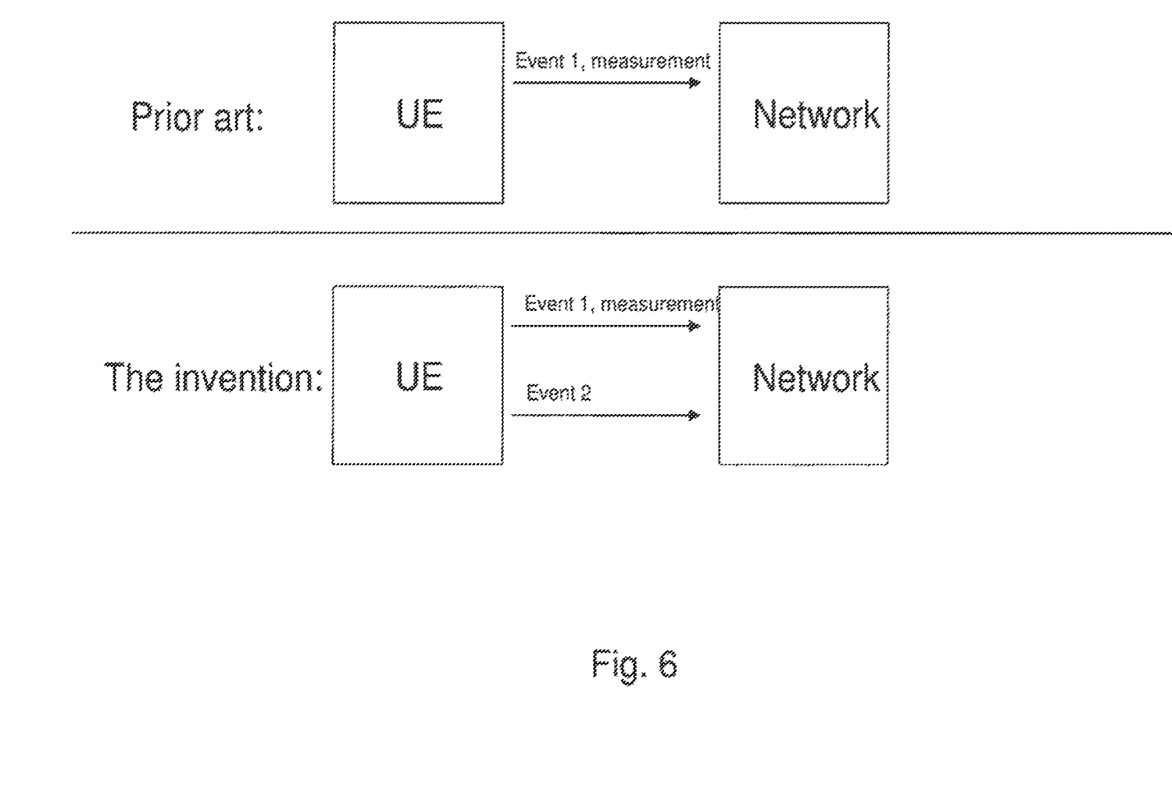
FIG. 6 is a conceptual illustration of an embodiment of the invention.

FIG. 6 is a conceptual illustration of an embodiment of the invention, exemplified by a case in which DRX cycles are used. A general prior art problem is that a UE 10 shortens its monitoring time intervals after each first event occurrence, since a handover command might be sent from the network. However, since a number of other actions that do not require a time interval shortening might be carried out by the network, this is done unnecessarily in many cases. This leads to unnecessarily high UE battery consumption.

Hence, the invention distinguishes the case of handover from the other cases by defining a specific second event, which indicates a higher probability of receiving a handover command in the UE 10. The event in itself can occur for a number of different parameter settings or configurations, of which some will be described below. Both the first and the second event are defined in relation to parameter measurements.

Figure 7:
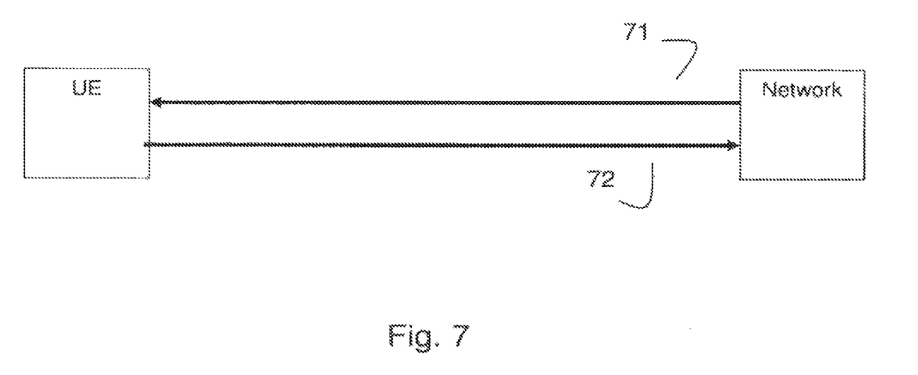
FIG. 7 illustrates an event configuration at the UE to enter into a non-DRX mode for handover command reception according to an embodiment of the invention.

According to embodiments of the invention, at first the network needs to configure an event (E2) that is specific to non-DRX mode at the UE 10, see FIG. 7. A person skilled in the art will realize that the configuration may take place in a network base station in the case of LTE. The event, E2, is described in the next section. Non-DRX-mode denotes here the state where a UE 10 either continuously (i.e. every sub-frame or TTI) monitors the downlink scheduling control channel or according to a shorter DRX cycle. The monitoring of downlink communication is thus caused to be performed at shortened time intervals. The event configuration, as well as the configuration of the shortened time intervals, may be done in the measurement control message or any other signaling message using RRC signaling. The configured parameters may include:

- Downlink measurement quality threshold ($\times 2$) above which the UE enters into non DRX mode. For LTE, RSRQ can be used as the measured parameter. For WCDMA, CPICH Ec/No may be a relevant quality measurement.
- Time to trigger. During this time period parameter measurements may be verified in the UE 10 in order to make sure that the conditions configured for the occurrence of an event are fulfilled more than on one occasion. A network base station 20 may configure the conditions for continued measurement during the time to trigger, whereby means 211-213 can be used.
- DRX cycle length after the event E2. This could be specified as DRX cycle before E2/M; where M is set by the network. As an example if M is set such that DRX cycle length after E2=0.5 ms, then the UE 10 monitors continuously or moves into a fully connected mode. Thus the parameter M can specify the length of the time intervals at which the UE 10 shall monitor the scheduling control channel after event E2 occurs.
- The minimum amount of time during which the UE 10, if not scheduled, remains in non DRX state after the occurrence of event E2. This can be specified in terms of N number of sub-frames, TTI, frames, DRX cycle lengths, or simply time duration.

According to embodiments of the invention the UE 10 monitors the scheduling control channel either continuously or according to a pre-configured shorter DRX cycle only when there is more certainty of receiving the handover command. The main benefit of this approach is that in case handover command is not required in response to the normal measurement reporting event (E1) the UE 10 will not waste its power by continuous monitoring of scheduling control channel.

Figure 8:
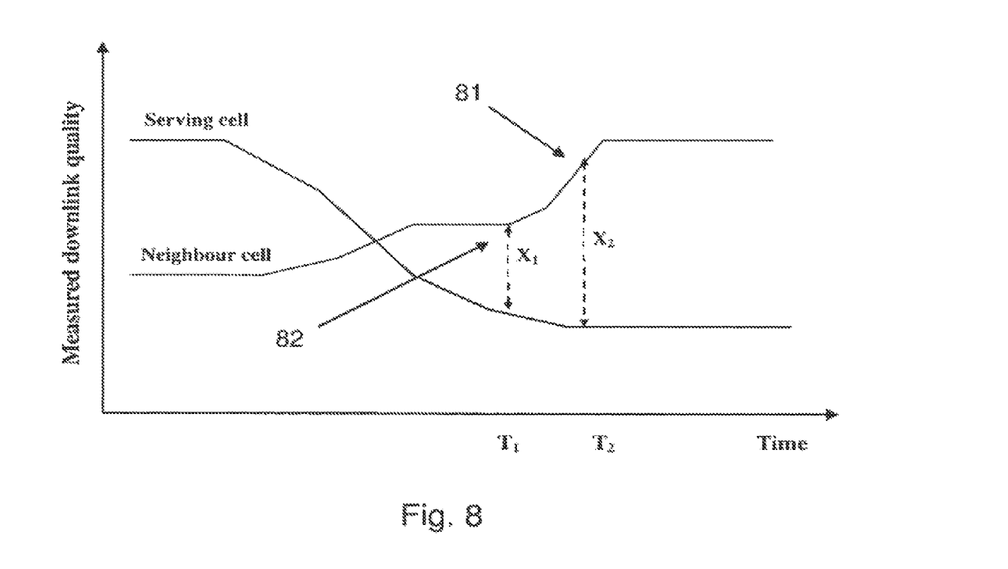
FIG. 8 illustrates an example of an event reporting and handover command reception in DRX-mode according to an embodiment of the invention.

This requires an additional event configuration in the UE 10. One example is shown in FIG. 8, in which the parameter measured downlink signal quality is used to define when events shall occur. The event (E2) can be configured to occur at a different threshold level compared to a threshold level configured for the occurrence of the first event as shown in the figure. The second event can be configured to occur when one or more measurement quantities deteriorate beyond a certain level. As an example the new event (E2) can occur when UE transmitted power is above a certain threshold and the downlink SINR is below another threshold. In one embodiment according to the invention the second event occurs when the user equipment transmitted power rises above a set level and when the measured downlink signal quality goes below another set level. Also, UE received power may be used as a suitable parameter for defining when events shall occur. For LTE, RSRP is a UE received power measurement and RSRQ is a UE received quality measurement that may be used in combination or individually. For WCDMA, the parameters CPICH RSCP and CPICH Ec/No, respectively, may be suitable parameters. As before, the threshold values used in E2 can be different compared to those used in Ei.

The new event (E2) is defined to indicate a higher probability of receiving a handover command in a user equipment than the original first event, which has been described in the background section.

FIG. 8 depicts that the UE 10 starts continuous monitoring of the scheduling channel {or with shorter pre-configured DRX cycle) at the onset of an event E2. As shown in the figure the threshold set for the event E2 is higher than for the event Ei. The example in FIG. 8 depicts an embodiment in which the measured downlink quality is used for determining whether the second event shall occur. The parameter RSRQ can be used in the case of LTE. The second event, whose occurrence triggers monitoring to be performed at shortened time intervals, occurs when the difference in measured downlink quality between the serving cell and a neighbour cell reaches a set level. The occurrence of only the first event, E1, does not cause any change in the monitoring time intervals.

According to another embodiment, the second event is configured to occur either when the measured downlink quality goes below a set level or when the user equipment transmitted power rises above another set level. Hence, as soon as either one of the parameters reaches a certain level the second event occurs. Also, as mentioned before, the parameters RSRQ and RSRP may be suitable in the case of LTE. It is to be understood that all parameters mentioned in this description may be used individually, as well as in combination, in order to define when the second event shall occur. For instance, the second event may occur when the user equipment transmitted power rises above a predetermined level.

The skilled person will, based on the examples described above, realize that other parameter configurations and combinations also may be used to decide when the second event shall occur.

A different time to trigger values can be used for the two events. The event Ei as stated before is a normal measurement reporting event. It could be that event Ei only triggers gap-assisted measurement on another carrier instead of handover. It may also lead to some other network action such as, e.g., congestion control. The main advantage of utilizing the method based on the second event (E2) is that UE can make more efficient use of battery consumption since the probability of handover command reception will be higher.

It is still probable, though less likely that UE 10 will not receive handover commands after the occurrence of event E2. But in order to cater for this rare scenario the UE 10 may again revert to the normal DRX cycle in case it is not scheduled for certain duration (e.g. after N sub-frames or frames) as configured by the network.

Figure 9:
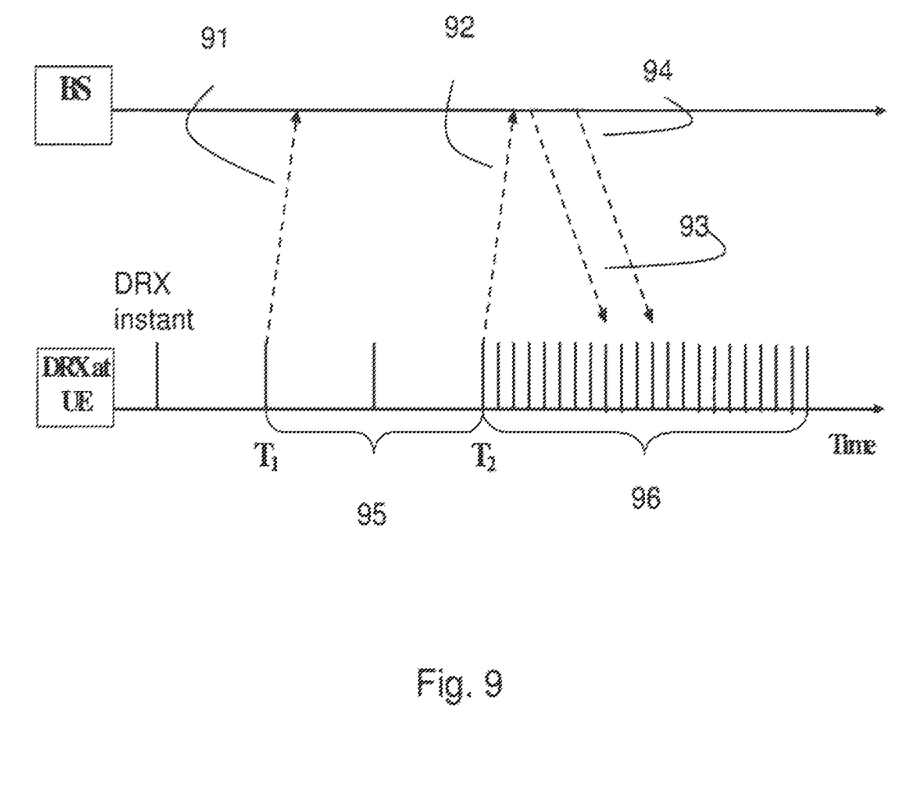
FIG. 9 illustrates a switching to a non-DRX-mode in order to receive a handover command according to an embodiment of the invention.

FIG. 9 shows an embodiment of the invention in which the UE maintains the on going DRX cycle after reporting event Ei, which is the normal measurement reporting. On the other hand the UE 10 enters into non DRX mode (i.e. either continuous monitoring of scheduling control channel or according to a shorter DRX cycle) after reporting event E2. Firstly, the UE 10 receives the scheduling information, comprising of resource blocks, sub-frames, frame number etc on which the UE 10 shall be scheduled to receive the handover command. The UE 10 eventually receives the handover command on the assigned resource blocks.

The above described embodiments of the invention are intended to be examples only. Alterations, modification, and variations may be effected to particular embodiments by those skilled in the art without departing from the scope of the invention, which is defined by the accompanying claims.

For instance, even though the above description uses the terms first event and second event, respectively, a person skilled in the art will realize that terms like first and second configuration, or first and second setting could be used to the same effect.

The invention claimed is:

1. A method in a user equipment located in a serving cell of a mobile communications network, said method comprising:
monitoring downlink communication at predetermined time intervals when operating in discontinuous reception mode,
performing communication measurements regarding at least one of the serving cell and one or more neighbor cells, and
after the occurrence of a first event, sending at least one of measurement data and a first event report from said user equipment to said network, wherein said sending is triggered by the occurrence of the first event, wherein
said monitoring is caused to be performed at shortened time intervals after the occurrence of a second event, wherein said second event is defined to indicate a higher probability of receiving a handover command than said first event, and wherein
said first event and said second event are defined in relation to a same measurement parameter, and wherein
said first event is caused by a first measurement on said same measurement parameter, and said second event is caused by a second measurement based on said same measurement parameter.

2. The method according to claim 1, wherein said first event and said second event are defined in relation to said measurement parameters.

3. The method according claim 1, wherein said second event occurs when the difference in measured downlink signal quality between the serving cell and a neighbor cell reaches a predetermined level.

4. The method according to claim 1, wherein said second event occurs when the measured downlink signal quality deteriorate beyond a predetermined level or when the user equipment transmitted power exceeds a predetermined level.

5. The method according to claim 1, wherein said second event occurs when the user equipment transmitted power exceeds a predetermined level and the measured downlink signal quality decreases below a predetermined level.

6. The method according to claim 1, wherein said monitoring at shortened time intervals is caused after a predetermined time period from said occurrence of said second event.

7. The method according to claim 6, wherein said communication measurements are continued to be carried out during said predetermined time period from said occurrence of said second event in order to verify that the conditions for said second event are fulfilled during the predetermined time period.

8. The method according to claim 1, wherein said second event is configured by the network.

9. The method according to claim 1, wherein the shortened time intervals after said second event occurs are set by the network.

10. The method according to claim 1, wherein the predetermined time intervals correspond to a predetermined DRX cycle.

11. A method in a base station in a serving cell of a mobile communications network, wherein a user equipment in the cell monitors downlink communication at predetermined time intervals when operating in discontinuous reception mode and performs communication measurements regarding at least one of the serving cell and one or more neighbor cells, said method comprising:
- configuring a first event in the user equipment, the occurrence of which triggers sending of at least one of measurement data and a first event report from the user equipment to the base station, and
- configuring a second event in the user equipment, the occurrence of which causes said monitoring to be performed at shortened time intervals, whereby said second event is defined to indicate a higher probability of sending a handover command to the user equipment than said first event, and wherein
  - said first event and said second event are defined in relation to a same measurement parameter, and wherein
  - said first event is caused by a first measurement on said same measurement parameter, and said second event is caused by a second measurement on said same measurement parameter.

12. The method according to claim 11, wherein said first event and said second event are defined in relation to said measurement parameters.

13. The method according to claim 11, wherein said second event occurs when the difference in measured downlink signal quality between the serving cell and a neighbor cell reaches a set level.

14. The method according to claim 11, wherein said second event occurs when the measured downlink signal quality deteriorate beyond a predetermined level or when the user equipment transmitted power exceeds a predetermined level.

15. The method according to claim 11, wherein said second event occurs when the user equipment transmitted power exceeds a predetermined level and the measured downlink signal quality decreases below a predetermined level.

16. The method according to claim 11, wherein said monitoring at shortened time intervals is triggered after a predetermined time period from said occurrence of said second event.

17. The method according to claim 16, wherein communication measurements are continued to be carried out during said predetermined time period from said occurrence of said second event in order to verify that the conditions for said second event are fulfilled during the predetermined time period.

18. The method according to claim 11, comprising configuring the shortened time intervals after said second event occurs.

19. The method according to claim 11, wherein the predetermined time intervals correspond to a predetermined DRX cycle.

20. A user equipment located in a serving cell of a mobile communications network, comprising:
- means for monitoring downlink communication at predetermined time intervals when operating in discontinuous reception mode,
- means for performing communication measurements regarding at least one of the serving cell and one or more neighbor cells,
- means for sending, after the occurrence of a first event, at least one of measurement data and a first event report from said user equipment to said network, wherein said sending is triggered by the occurrence of the first event, and
- means for causing said monitoring to be performed at shortened time intervals after the occurrence of a second event, wherein said second event is defined to indicate a higher probability of receiving a handover command than said first event, and wherein
  - said first event and said second event are defined in relation to a same measurement parameter, and wherein
  - said first event is caused by a first measurement on said same measurement parameter, and said second event is caused by a second measurement based on said same measurement parameter.

21. The user equipment according to claim 20, wherein said first event and said second event are defined in relation to said measurement parameters.

22. The user equipment according to claim 20, wherein said second event occurs when the difference in measured downlink signal quality between the serving cell and a neighbor cell reaches a predetermined level.

23. The user equipment according to claim 20, wherein said second event occurs when the measured downlink signal quality deteriorate beyond a predetermined level or when the user equipment transmitted power exceeds a predetermined level.

24. The user equipment according to claim 20, wherein said second event occurs when the user equipment transmitted power exceeds a predetermined level and the measured downlink signal quality decreases below a predetermined level.

25. The user equipment according to claim 20, wherein said means for monitoring is caused to perform said monitoring at shortened time intervals after a predetermined time period from said occurrence of said second event.

26. The user equipment according to claim 25, wherein said means for performing communication measurements is caused to carry out communication measurements during said predetermined time period, further comprising means for verifying that the conditions for said second event are fulfilled during the predetermined time period based on said measurement parameters.

27. The user equipment according to claim 20, comprising means for allowing said second event to be configured by the network.

28. The user equipment according to claim 20, comprising means for allowing the shortened time intervals after said second event occurs to be set by the network.

29. The user equipment according to claim 20, wherein the predetermined time intervals correspond to a predetermined DRX cycle.

30. A base station in a serving cell of a mobile communications network, whereby a user equipment in the cell monitors downlink communication at predetermined time intervals when operating in discontinuous reception mode and performs communication measurements regarding at least one of the serving cell and one or more neighbor cells, comprising:

means for configuring a first event in the user equipment, the occurrence of which triggers sending of at least one of measurement data and a first event report from the user equipment to the base station, and     means for configuring a second event in the user equipment, the occurrence of which causes said monitoring to be performed at shortened time intervals, whereby said second event is defined to indicate a higher probability of sending a handover command to the user equipment than said first event, and wherein         said first event and said second event are defined in relation to a same measurement parameter, and wherein         said first event is caused by a first measurement on said same measurement parameter, and said second event is caused by a second measurement based on said same measurement parameter.

31. The base station according to claim 30, wherein said first event and said second event are defined in relation to said measurement parameters.

32. The base station according to claim 30, comprising means for configuring said second event to occur when the difference in measured downlink signal quality between the serving cell and a neighbor cell reaches a set level.

33. The base station according to claim 30, comprising means for configuring said second event to occur when the measured downlink signal quality deteriorate beyond a predetermined level or when the user equipment transmitted power exceeds a predetermined level.

34. The base station according to claim 31, comprising means for configuring said second event to occur when the user equipment transmitted power exceeds a predetermined level and the measured downlink signal quality decreases below a predetermined level.

35. The base station according to claim 30, comprising means for configuring said monitoring at shortened time intervals to be caused after a predetermined time period from said occurrence of said second event.

36. The base station according to claim 35, comprising means for configuring the communication measurements to be continued to be carried out during said predetermined time period from said occurrence of said second event in order to verify that the conditions for said second event are fulfilled during the predetermined time period.

37. The base station according to claim 31, comprising means for configuring the shortened time intervals after said second event occurs.

38. The base station according to claim 31, wherein the predetermined time intervals correspond to a predetermined DRX cycle.

39. A user equipment located in a serving cell of a mobile communications network, comprising:

a processor configured to monitor downlink communication at predetermined time intervals when operating in discontinuous reception mode, wherein the processor is further configured to perform communication measurements regarding at least one of the serving cell and one or more neighbor cells,     an antenna arrangement configured to send, after the occurrence of a first event, at least one of measurement data and a first event report from said user equipment to said network, wherein said sending is triggered by the occurrence of the first event, and wherein         the processor is further configured to cause said monitoring to be performed at shortened time intervals after the occurrence of a second event, wherein said second event is defined to indicate a higher probability of receiving a handover command than said first event, and wherein         said first event and said second event are defined in relation to a same measurement parameter, and wherein         said first event is caused by a first measurement on said same measurement parameter, and said second event is caused by a second measurement based on said same measurement parameter.

40. The user equipment according to claim 39, wherein said first event and said second event are defined in relation to said measurement parameters.

41. The user equipment according to claim 39, wherein the predetermined time intervals correspond to a predetermined DRX cycle.

42. A base station in a serving cell of a mobile communications network, whereby a user equipment in the cell monitors downlink communication at predetermined time intervals when operating in discontinuous reception mode and performs communication measurements regarding at least one of the serving cell and one or more neighbor cells, the base station comprising:

a processor adapted to configure a first event in the user equipment, the occurrence of which triggers sending of at least one of measurement data and a first event report from the user equipment to the base station, wherein         the processor is also adapted to configure a second event in the user equipment, the occurrence of which causes said monitoring to be performed at shortened time intervals, whereby said second event is defined to indicate a higher probability of sending a handover command to the user equipment than said first event, and wherein         said first event and said second event are defined in relation to a same measurement parameter, and wherein         said first event is caused by a first measurement on said same measurement parameter, and said second event is caused by a second measurement based on said same measurement parameter.

43. The base station according to claim 42, wherein said first event and said second event are defined in relation to said measurement parameters.

44. The base station according to claim 42, wherein the predetermined time intervals correspond to a predetermined DRX cycle.

* * * * *